(12) United States Patent
Van De Velde

(10) Patent No.: US 11,317,642 B2
(45) Date of Patent: May 3, 2022

(54) COATED SUSHI ROLL AND METHOD OF MANUFACTURING AND PREPARING THE SAME

(71) Applicant: AJI FOOD B.V., Bilthoven (NL)

(72) Inventor: Jeroen Marinus Antonie Van De Velde, Bilthoven (NL)

(73) Assignee: AJI FOOD B.V., Bilthoven (NL)

( * ) Notice: Subject to any disclaimer, the term of this patent is extended or adjusted under 35 U.S.C. 154(b) by 0 days.

(21) Appl. No.: 15/323,820

(22) PCT Filed: Jul. 6, 2015

(86) PCT No.: PCT/NL2015/050494
§ 371 (c)(1),
(2) Date: Jan. 4, 2017

(87) PCT Pub. No.: WO2016/003287
PCT Pub. Date: Jan. 7, 2016

(65) Prior Publication Data
US 2017/0143018 A1    May 25, 2017

(30) Foreign Application Priority Data
Jul. 4, 2014    (NL) ..................... 2013122

(51) Int. Cl.
*A23L 7/196*    (2016.01)
*A23P 20/25*    (2016.01)
*A23P 20/12*    (2016.01)

(52) U.S. Cl.
CPC ............. *A23L 7/196* (2016.08); *A23L 7/1963* (2016.08); *A23L 7/1965* (2016.08); *A23P 20/12* (2016.08); *A23P 20/25* (2016.08)

(58) Field of Classification Search
CPC ...... A23L 7/196; A23L 7/1963; A23L 7/1965; A23P 20/25
See application file for complete search history.

(56) References Cited

U.S. PATENT DOCUMENTS

2005/0214437 A1* 9/2005 Cocco ................. A23P 30/25
                                                      426/615
2012/0177787 A1* 7/2012 Mizuno ................ A23B 4/06
                                                      426/92
(Continued)

FOREIGN PATENT DOCUMENTS

DE    202008002368 U1    8/2008
EP          2454949 A1    5/2012
(Continued)

OTHER PUBLICATIONS

Lea's Cooking. "How to Make Fried Sushi" May 16, 2012 http://leascooking.blogspot.com/2012/05/fried-sushi.html.*
(Continued)

*Primary Examiner* — Katherine D Leblanc
(74) *Attorney, Agent, or Firm* — Perry + Currier Inc.

(57) ABSTRACT

In order to manufacture a food product which, with further preparation, can be given a form in which it is ready for immediate consumption, a consumable, at least sushi-like product roll is prepared. The product roll comprises a core with a filling which is enveloped by a casing of a high-carbohydrate composition followed by a barrier layer which covers the casing. The barrier layer is covered with a batter layer and the batter layer is covered with a crumb layer. The thus obtained body is subjected to a freezing step for complete freezing thereof. By way of preparation the frozen product roll, after optionally being defrosted, is heated by being baked or deep-fried until the core is at least no more than just defrosted, while the batter layer with the crumb layer has formed into a crispy outer layer. The product is thus given a directly consumable form.

15 Claims, 1 Drawing Sheet

(56) References Cited

U.S. PATENT DOCUMENTS

| | | | |
|---|---|---|---|
| 2013/0059040 | A1 | 3/2013 | Proper |
| 2013/0115337 | A1 | 5/2013 | Sheets et al. |

FOREIGN PATENT DOCUMENTS

| | | |
|---|---|---|
| JP | S5542908 U | 3/1980 |
| JP | S60125886 U | 8/1985 |
| JP | H01228431 A | 9/1989 |
| JP | H0797565 A | 4/1995 |
| JP | 2004166675 A | 6/2004 |
| JP | 2006101878 A | 4/2006 |
| JP | 3144776 U | 9/2008 |
| WO | WO-2005112664 A1 | 12/2005 |

OTHER PUBLICATIONS

"Las Vegas Roll" Jan. 11, 2012 http://www.tadaskookykitchen.com/2012/01/las-vegas-roll-sushi.html (Year: 2012).*

Moskin, Julia. "Sushi Fresh from the Deep . . . the Deep Freeze" Apr. 8, 2004 https://www.nytimes.com/2004/04/08/nyregion/sushi-fresh-from-the-deep-the-deep-freeze.html (Year: 2004).*

International Search Report dated Nov. 20, 2015 for PCT International Application No. PCT/NL2015/050494.

Dutch Search Report dated Jan. 29, 2015 for Dutch Patent Application No. 2013122.

Information Disclosure Statement by Applicant for U.S. Appl. No. 15/323,820.

Sushi-San, "Suchi recept: Futomaki lavarol", Feb. 9, 20123,(opgehaald van internet op Oct. 3, 2016), * bladzijden 1-3.

C. Lormans-Giebels,"Meridiez-Sushi in Aken", Aug. 12, 2013, (opgehaald van internet op Oct. 3, 2016), bladzijden 1,2.

The Crushi, "Crushi, sushi met een crunchy bite, uniek en margerijk—Appetizer" Blog Post Jul. 2, 2017 [Retrieved from the Internet on Jan. 2, 2018, URL: http://thecrushi.com/crush-sushi-met-een-crunchy-bite-uniek-en-margerijk-appetizer/].

Madelen, "Vegetarian sushi tempura style", (Feb. 24, 2011), p. 8PP, Madelen's Recipes, URL: http://www.madelensrecipes.com/2010/04/vegetarian-sushi-tempura-style/, (Oct. 7, 2015).

EPO, Communication pursuant to Article 94(3) EPC, dated Feb. 12, 2018, re European Patent Application No. 15751123.9.

Frostkorone Tiefkuehlkost GmBH, The World of frozen food <https://web.archive.org/web/20100104201510/https://frostkrone.de/ (with English translation).

Ota, S., et al., "Theory and Practice of Fried Foods", Saiwai Shobou Publishing, Apr. 1, 1989 (rev. ed.), pp. 197-199.

JPO, Decision of Refusal (with English translation), dated Apr. 16, 2019, re Japanese Patent Application No. 2017-501327.

Ota, S., et al., "Theory and Practice of Fried Foods" with English translation of relevant section of D3 referred to in the Japanese reasons for refusal, Saiwai Shobou Publishing, dated Apr. 1, 1989 (rev. ed.). Reference (JP language only) previously disclosed in IDS submitted on Apr. 16, 2019.

* cited by examiner

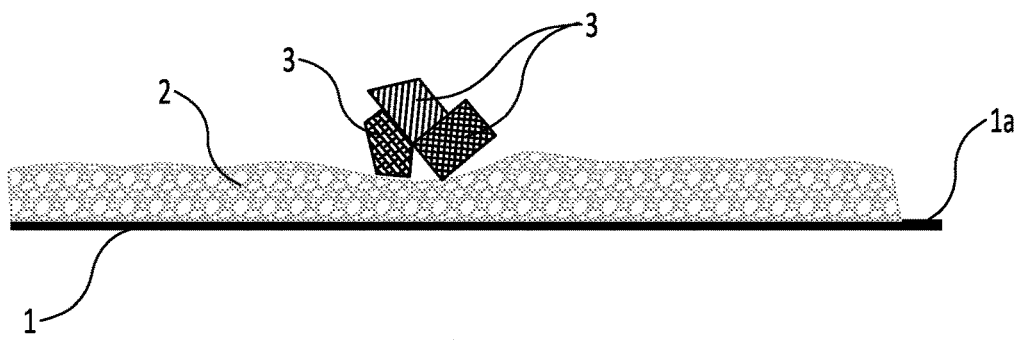
Fig. 1A
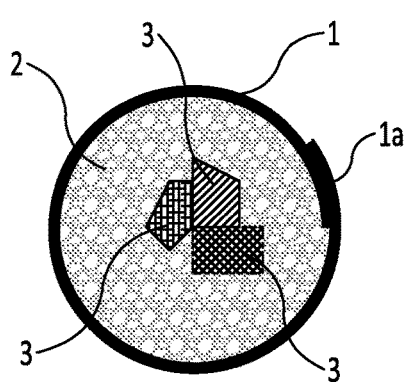 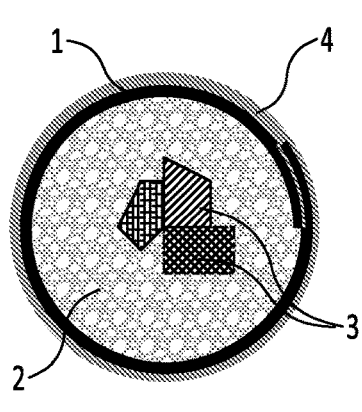 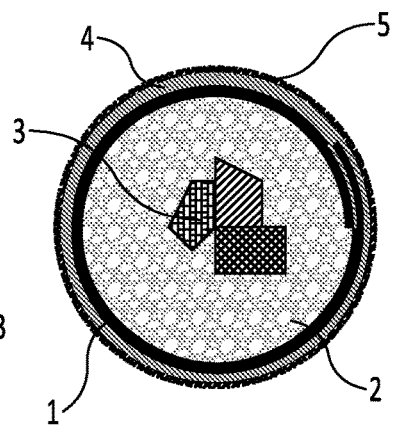
Fig. 1B    Fig. 1C    Fig. 1D
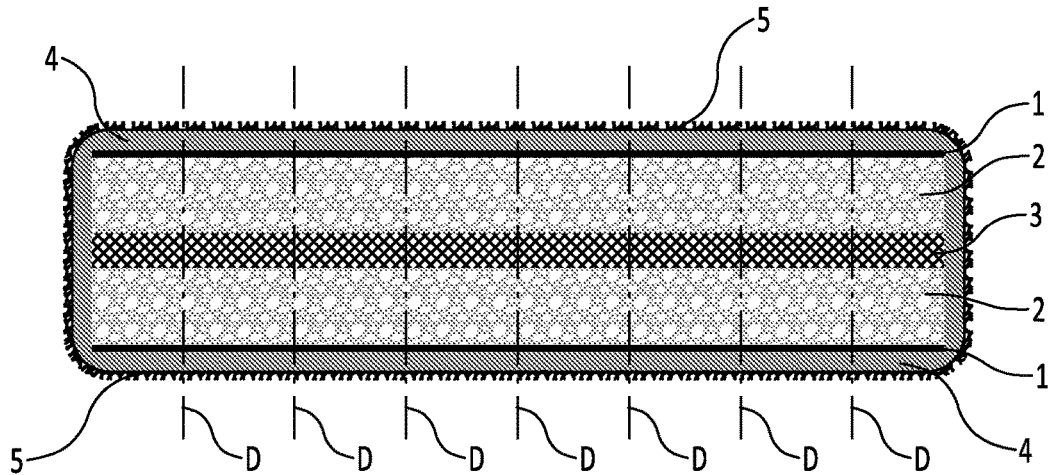
Fig. 2

COATED SUSHI ROLL AND METHOD OF MANUFACTURING AND PREPARING THE SAME

The present invention relates to a method for manufacturing a food product which, with further preparation, can be given a form in which it is ready for immediate consumption, wherein a consumable, at least sushi-like product roll is prepared, comprising a core with a filling which is enveloped by a casing of a high-carbohydrate composition and a barrier layer covering the casing. The invention also relates to a food product as such, and to a method for preparing such a food product.

A known example of a food product comprising a product roll with a filling inside a closed casing is a croquette, wherein the meat croquette is the most usual form thereof in this country. A meat croquette is made from a high-carbohydrate salpicon of meat (a type of thick ragout) which in cold state is formed into a roll. Beef croquettes and veal croquettes are luxury variants. In addition, there are for instance also shrimp croquettes and vegetable croquettes on the basis of a salpicon with shrimp and a vegetable puree as filling. The roll formed from the filling is rolled through egg, flour and breadcrumbs such that the croquette is properly sealed on all sides and the whole cannot burst during final preparation. As final preparation the croquette is deep-fried or baked, whereby a crispy crust results and the ragout is warmed up again. The light crust cools quite quickly but the filling remains warm for a long time, whereby some care must be taken while eating.

On an industrial scale the croquette formed in the above described manner is frozen and packaged in desired numbers. The croquette, optionally after being defrosted, can then be given a form suitable for immediate consumption by deep-frying or baking and served. The filling is heated here, and the layer of breading or breadcrumbs is formed into a crispy crust.

At the beginning of the twentieth century croquettes were still served as a side-dish in an extensive menu, after the soup and before the main course. The evolution from stylish side-dish to snack took place after the Second World War. The croquette now exists in diverse variants such as satay croquettes, shrimp croquettes and asparagus croquettes as well as meat and veal croquettes, and are one of the most commonly sold snacks, finding their way to consumers mainly via snack bars and cafeterias. 300 million croquettes are consumed yearly in the Netherlands. This is about 25 per person. This success has also been to the detriment of the croquette, which has now lost its initial prestige as stylish delicacy and has been devalued to an ordinary snack in the snack bar.

A delicacy which still has appeal and is appreciated as such is sushi. Sushi is a dish from the traditional Asian, particularly Japanese, kitchen, with a diameter of several centimeters. It consists of cooled boiled rice which has been soured with rice vinegar. This is typically combined with a filling of fish, seafood, fried egg, vegetables and sometimes tropical fruits. The best-known type of sushi in the West is maki, which literally means rolled. The rice is laid together with the other ingredients on a sheet of nori and then rolled up tightly into a cylinder with a diameter of about three centimeters. The thus obtained sushi roll is then usually cut into six or eight slices. There are several types of maki. Futomaki is for instance a slightly thicker product roll of about four centimeters, which often has three different other fillings in addition to the rice. Hosomaki on the other hand is a thinner product roll with a diameter of about two centimeters, usually with only one other filling. Ukimaki is a variant wherein it is the other ingredients which are wrapped in the nori, and the rice is on the outer side.

Best known by far as filling is raw fish. Salmon, tuna and mackerel are the most commonly used types of fish in Europe. Other seafood besides fish, such as shrimp, crab and squid, is also used as ingredients for sushi. Roe, the ripe eggs of a fish, is also found in some sushi. In addition to fish and other seafood many vegetables are also used, wherein carrot, cucumber, avocado, asparagus and corn are best known, particularly in the West. Characteristic for the product is the freshness of the ingredients used therein. This is also a drawback however, i.e. the ingredients have to be kept fresh and the sushi thereby has a very limited shelf-life. In addition, preparation of sushi requires skill and time, whereby this product remains expensive and has thus far remained unsuitable for large-scale production and distribution in the catering industry and to the consumer in the same way as the croquette.

The present invention has for its object, among others, to provide a food product, and a method for producing and preparing thereof, which has the appearance of sushi yet manages to combine this with the market potential and the convenience of use of for instance a croquette.

In order to achieve the stated object a method of the type described in the preamble has the feature according to the invention that the barrier layer is covered with a batter layer, that a crumb layer is arranged on the batter layer and that the thus obtained body is subjected to a freezing step for complete freezing thereof. It has surprisingly been found that a thus encased sushi-like roll can be brought from the described frozen state into a state ready for immediate consumption by means of baking or deep-frying while retaining the sense of freshness and exclusivity characteristic for sushi. The crispy outer layer adds a pleasant and tasty bite thereto, this being protected by the barrier layer between the moisture-containing high-carbohydrate casing and the crumb layer. Possible moisture in the casing hereby remains confined in the product and so also keeps the high-carbohydrate filling from drying out. The product nevertheless provides the convenience and the shelf-life of a freezer snack, such as a croquette, whereby it is possible to open up a considerably wider market therewith than with freshly prepared sushi.

In order to optimally preserve the quality and flavour of the filling a preferred embodiment of the method according to the invention has the feature that the freezing step is performed by dry-freezing or shock-freezing at a starting temperature of a maximum of around −60° C. Such an extremely low freezing temperature results in a very rapid freezing of the product and can for instance be achieved by dry-freezing or shock-freezing in liquid gas, such as liquid nitrogen or carbon dioxide. The product roll cools completely here to the final frozen product within a very short time, whereby the freshness of the ingredients used is preserved. Particularly in the case of ingredients which are still warm to some extent and which have for instance been cooked by being heated before processing, shock-freezing or dry-freezing better counteracts condensation in the product roll, whereby a texture and a flavour of the product roll remain unaffected. The dry-freezing or shock-freezing can be performed with conventional dry-freezing installations, wherein recourse can be had to a commercially available installation.

An important function of the barrier layer is to exclude moisture, which could otherwise exit the filling during heating of the product and eventually moisten the crumb layer, whereby it does not bake crisply. This barrier layer can per se be formed and arranged in different ways. Use can thus for instance be made therefor of a coating with which the casing is covered, and the batter layer itself, optionally by adding an additive which enhances a final moisture-tightness of the batter layer, can also form the barrier layer at a boundary layer with the casing. In a further particular embodiment the method according to the invention is however characterized in this respect in that an edible sheet is employed as barrier layer, in particular a sheet of (sea)weed (nori) or rice paper, in which the casing and filling are rolled. An edible sheet, such as nori and rice paper, excludes moisture for a sufficiently long time to allow the outer layer to be baked in nicely crisp manner during the (post-)preparation, while it can also serve for rolling the casing and filling therein to form a product roll.

A particularly tasty end product is obtained with a further preferred embodiment of the method according to the invention, characterized in that an optionally partially cooked grain product, particularly at least partially cooked rice, is applied as casing. A further embodiment is more particularly characterized here in that the grain product is at least partially cooked by heating and with the addition of moisture, and in at least partially cooled state is subsequently incorporated into the casing to form at least essentially a traditional sushi roll. Although the product roll which is thus incorporated in the food product essentially comprises a traditional sushi roll, the unique crispy outer layer applied therearound according to the invention nevertheless produces, in combination with a post-preparation such as for instance baking or deep-frying in fat, oil or hot air, a particularly surprising bite and pleasant mouthfeel which by far surpass those of traditional sushi.

The product roll is moreover kept in frozen state until (post-)preparation for the purpose of serving, whereby a shelf-life of the product is longer as compared to fresh sushi such that this need no longer be a practical objection to carrying the product. In this context a further particular embodiment of the method according to the invention has the feature that at least one product from a group comprising vegetables, fruit, meat, fish, seafood and dairy is used as the filling, and more particularly that the filling is applied in raw, at least uncooked, or fresh, at least refreshed, form and is kept therein at least up to the freezing step. Owing to the freezing step to which the product according to the invention is finally subjected, such usually relatively perishable fillings can nevertheless be readily incorporated in the food product according to the invention. A 'refreshed product' is understood here to mean that the product was frozen in a state in which it was fresh or more or less perishable and was later defrosted so as to return it more or less to its original (fresh or more or less perishable) form.

The batter layer and crumb layer can per se be chosen as desired and for instance be adapted to the nature and composition of the filling and casing. Particular further embodiments of the method according to the invention respectively have the feature in this context that the batter layer is formed by mixing a part flour with water to a cohesive batter, optionally with the addition of egg and/or baking powder, wherein the flour is preferably taken from a group of rice flour, tapioca flour and cornflour, and that breadcrumbs, in particular Japanese breadcrumbs (Panko), are used for the crumb layer.

The present invention also relates to a food product which could be manufactured according to one or more of the above described embodiments of the method according to the invention. A food product which comprises a body with a core comprising a filling and a casing of a high-carbohydrate composition extending round the core particularly has the feature in this respect that the filling and the casing form part of a frozen sushi roll, that the casing is enveloped by a barrier layer, that the barrier layer is covered with a batter layer, and that a crumb layer is arranged over the batter layer. In a particular embodiment the food product according to the invention is further characterized in that the high-carbohydrate composition comprises an at least partially cooked grain product, in particular at least partially cooked rice, and the filling comprises at least one ingredient from a group comprising vegetables, fruit, meat, fish, seafood and dairy, wherein the product of the filling is preferably still in raw, at least incompletely cooked, form.

This product, which after preparation can be served and consumed as a crispy sushi, is found to provide an unparalleled mouthfeel and an exceptionally pleasant flavour which both surpass those of fresh sushi. In addition to this, the shelf-life of the initial product, in contrast to fresh sushi, can be guaranteed for a longer period as long as its frozen state is maintained. From a logistical viewpoint this is a particularly great advantage for the catering industry which opens the way to large-scale use.

A particular embodiment of the food product according to the invention has the feature that the frozen body comprises an at least substantially cylindrical body having a diameter of between about 2 and 8 centimeters at a length of between about 5 and 20 centimeters. A product with such a diameter can be deep-fried at usual domestic deep-frying temperatures, wherein the hatter and crumb layers form into an evenly fried crispy crust while the filling remains cool. In the case of products with a smaller diameter, i.e. a thinner roll, the filling is also heated, while the outer layer has not yet crisped and browned, which, since this detracts from the optimal mouthfeel and flavour, is a drawback in the case of a usual sushi filling of raw, at least uncooked, parts which are preferably consumed cool. A product with a larger diameter is less desirable because in a usual deep-fryer or oven device the crispy outer layer is in that case overcooked while the filling is still frozen. A product with such a larger diameter is moreover more difficult to process into an end product easily consumable as finger food.

Finally, the invention also relates to a method for preparing one or more of the above described food products according to the invention, which method according to the invention is characterized in that the frozen product roll, after optionally being defrosted, is heated by being baked or deep-fried until the core is at least no more than just defrosted, while the batter layer with the crumb layer has formed into a crispy outer layer and is thus given a directly consumable form. In the frozen state the food product according to the invention is an intermediate product with a long shelf-life which can then be prepared quickly and easily into a directly consumable final product by the stated heating step.

It is important here that the casing forms an additional insulating layer between the filling and the batter and crumb layers whereby a rise in temperature is drawn very uniformly from the outer side with the batter and crumb layer to the core with the filling. The batter layer with crumbs can hereby form into a crispy crust, while the filling is protected from too great a rise in temperature. The temperature of the filling preferably does not exceed room temperature, or hardly so, in the end product, while a temperature of the casing progresses gradually from relatively warm adjacently of the batter layer to pleasantly warm close to the core. This is particularly advantageous when the filling comprises ingredients which should preferably not be heated, or at least not heated too much, such as fresh, raw ingredients.

A particular embodiment of the method for preparing the described food product has the feature according to the invention that the product roll is deep-fried in oil, fat or hot air, and more particularly that the product roll is allowed a resting time of several minutes after deep-frying and before serving the body. Deep-frying, particularly in oil or fat at increased temperature, imparts an additional flavour sensation to the product. The resting time which is preferably imposed afterward extracts heat from the casing and guides it into the still slightly frozen or still cold core, whereby it reaches a correct final temperature. The outer layer retains its crispy character here, also because of the barrier layer which is present.

For an attractive presentation a preferred embodiment of the preparation method according to the invention has the feature that the product roll is divided into at least substantially equal slices and at least some of the slices are arranged in orderly manner on a plate and already provided with a suitable garnish before serving.

The invention will now be further elucidated on the basis of an exemplary embodiment and an accompanying drawing. In the drawing:

FIGS. 1A-D show schematically a first exemplary embodiment of a method and product according to the invention in successive stages of manufacture; and FIG. 2 shows a longitudinal section of an exemplary embodiment of a food product according to the invention.

The figures are otherwise purely schematic and not drawn to scale. For the sake of clarity some dimensions in particular may be exaggerated to a greater or lesser extent. Corresponding parts are generally designated in the figures with the same reference numeral.

For manufacture of an embodiment of a food product according to the invention use is made of a product roll in the form of a more or less traditional sushi roll. This is prepared, see FIG. 1A, by placing a layer 2 of cooked rice on a layer of one or several edible sheets 1, in this example sheets of edible seaweed (purple laver), usually referred to as nori. Instead of nori use can if desired also be made of another edible sheet or paper, such as for instance rice paper. The layer formed therefrom forms in the final product a barrier layer 1 which is intended to exclude moisture. The material of the layer therefore has to be moisture-tight or at least moisture-retardant, and should not degrade, such as fall apart, under the influence of moisture.

The rice 2 used, which is also called meshi, has short, thick grains, and is substantially fully cooked by being boiled or steamed so that the grain structure and bite thereof are preserved. Rice vinegar is added afterward or during cooking in order to give the rice a characteristic slightly acidic flavour. Other ingredients which determine or form flavour can optionally also be added to the rice. The rice is very sticky, whereby the rice is easily kneadable and remains stuck together. The rice is preferably processed when completely cold or lukewarm in order to prevent possible residual heat from the rice affecting the filling. This moreover counteracts the possible occurrence of condensation in the product roll during subsequent freezing.

Lying on the sheet 1 of nori, the rice 2 together with the other ingredients 3 which will form a filling in the core of the sushi roll is rolled up tightly into roughly a cylinder with a diameter of about three centimeters, see FIG. 1B. Use can be made for the rolling of a rolling mat specifically intended for the purpose or of a mechanical process. The resulting body is a so-called maki. In the previous step a narrow strip 1a of nori sheet 1 was left clear of rice. In the rolled product this strip forms a small overlap with the back of the opposite side of the nori sheet, see FIG. 1B, and after being lightly moistened can be adhered thereto in order to hold the product roll together.

There are several types of maki. Futomaki is for instance a somewhat thicker roll of about four centimeters which often has three different ingredients as filling of the core inside the rice casing. Hosomaki on the other hand is a thinner roll of about two centimeters diameter, usually having only one ingredient as filling. The diameter of the final roll can increase as more (types of) products are used in the filling. Within the scope of the present invention however the diameter of the product roll is in any event preferably kept under 8 centimeters.

Use can be made of diverse variations for filling 3. Whole parts (pieces, cubes or strips) taken from a group of vegetables, fruit, meat, fish, seafood and dairy are preferably used herefor. Cucumber, seaweed, daikon, carrot, avocado, asparagus and corn are for instance suitable vegetable options. Yellowtail, Atlantic surf clam, scallop, squid, mackerel, salmon, tuna, sea bass and eel are suitable as fish and seafood. Surimi, crab, (surf) clam, scallop, shrimp and lobster can further also be used as luxury filling. Omelette, fried tofu and roe (of for instance herring, salmon or flying fish) are in addition highly rated ingredients suitable for the filling 3 of the maki roll. Finally, a less conventional meat filling, for instance poultry (chicken) or steak (tenderloin), can be applied as a variation to the traditional sushi.

Once nori 1, rice 2 and filling 3 have been rolled into a sturdy product roll, one or more product rolls are formed therefrom, typically with a length of between 5 and 20 centimeters, in this example about 12 centimeters. The thus obtained product roll is drawn through a batter or a batter is sprayed over the roll in order to form a substantially sealing batter layer 4 on nori layer 1, see FIG. 1C. The nori layer is now completely covered with the batter layer 4.

Use is preferably made for the batter of tempura batter. This batter consists of a part flour, ice cold water and (often) an egg. It is mixed for a very short time into a firm and cohesive batter. The ice cold water ensures that the baked product becomes crispy and light and absorbs less fat. Variants are possible here in respect of the composition of the flour. Tapioca flour, rice flour, cornflour and, if desired, baking powder can be applied for this purpose, or a mixture of these and other types of flour.

Finally, the still moist batter layer 4 is sprinkled with breadcrumbs, or the product roll with the still moist batter layer 4 on the outer side is rolled through breadcrumbs so as to form a covering layer of crumbs 5 thereon, see FIG. 1D. Japanese breadcrumbs, so-called Panko, are preferably used for the crumb layer 5. It is otherwise also possible instead to use a different crumb layer, for instance of breading, if the filling and casing of the product require this.

After optionally having been pre-baked or pre-fried, the thus obtained food product is then fully frozen in a short period of time in a freezing step so that the frozen product roll shown in FIG. 2 is obtained. Use is preferably made here of dry-freezing or shock-freezing at a very low freezing temperature of −60° C. or lower. This has the advantage that flavour and texture of the product are better preserved as a result. If the product is intended for sale and placed in a determined number in a packaging for this purpose, the freezing step is preferably performed in the packaging. This avoids the possibility of the product roll already defrosting, at least partially, during the packaging process.

The frozen product now has a long shelf-life despite the fresh, optionally still raw, filling thereof. In order to give the product a form in which it can be served immediately, a desired number of product rolls is taken (from the packaging) and heated by being deep-fried or baked. In this exemplary embodiment use is made for this purpose of a deep-frying bath with hot oil or fat, although it is also possible to opt for hot air-frying, wherein only a little oil is used.

The product is left in a deep-frying bath at between 160-180° C. for 5-6 minutes, wherein the batter layer 4 with breadcrumbs 5 forms into a browned, crispy crust. Filling 3 of the product roll has not yet defrosted, or hardly so, and is well below room temperature. The product is then removed from the bath and left to rest for a similar period of time. The heat capacity and temperature of rice casing 2 now provide for a further heating of the filling with simultaneous cooling of the casing itself, while harrier layer 1 protects crust 4,5 against moisture exiting the casing. The casing is eventually cooled to some extent and the core warmed to a pleasant temperature at most a little above room temperature.

The product roll is now cut into a number of slices, shown schematically by the dividing lines D in FIG. 2, each of a thickness of roughly a centimeter, and these slices are arranged on a platter or plate. An appropriate garnish, for instance of pickled ginger, wasabi, soy sauce and wakame (seaweed), can optionally be added thereto in order to complete the whole for serving. The dish is preferably served with chopsticks.

Although the invention has been further elucidated above with reference to only a single exemplary embodiment, it will be apparent that the invention is by no means limited thereto. On the contrary, many other variations and embodiments are possible within the scope of the invention. As variation to rice, another grain product can for instance thus be applied for the casing in order to manufacture a sushi-like product roll. Fine-grained grains such as millet and quinoa are particularly suitable in this respect as variant to a traditional sushi.

The invention claimed is:

1. A method for producing a food product to be prepared in a form in which said food product is ready for immediate consumption, having a crispy outer layer comprising a batter layer, said method comprising, in that order, the steps of:
   (i) preparing a product roll, having a diameter of between 2 and 8 centimeters and a length of between 5 and 20 centimeters, by:
      providing an edible core that is ready for immediate consumption, comprising at least one product selected from the group consisting of vegetables, fruits, meats, fishes, seafoods and dairy products;
      surrounding said core with a casing of an at least partially cooked grain product to form a cylindrical body that comprises said core surrounded by said casing;
      surrounding said cylindrical body by a barrier layer of an edible sheet;
      forming a batter by mixing a part flour with water to form a cohesive batter;
      coating said barrier layer with the batter to form a layer of said batter over the cylindrical body; and
      arranging crumbs on said batter layer to form a crumb layer;
   (ii) subjecting said product roll to a freezing step for complete freezing thereof to a frozen state by dry-freezing or shock-freezing at a maximum starting temperature of around negative 60 degrees Celsius prior to heating the product roll by baking or deep-frying;
   (iii) storing said product roll in said frozen state; and
   (iv) deep-frying or baking said product roll from said frozen state to a state at which said batter and crumb layer are baked or deep-fried into the crispy outer layer, while said core is no more than just defrosted, to bring the product into said form in which it is ready for immediate consumption;
      wherein the at least one product used to form the edible core is applied in a raw, uncooked, fresh, or refreshed form, and is kept that way at least up to the freezing step of step (ii).

2. The method as claimed in claim 1, wherein the product roll is deep-fried in oil, fat or hot air.

3. The method as claimed in claim 2, wherein the product roll is allowed a resting time of several minutes after deep-frying and before serving the body.

4. The method as claimed in claim 1, wherein the edible sheet is a sheet of seaweed (nori) or rice paper.

5. The method as claimed in claim 1, wherein the at least partially cooked grain product is at least partially cooked by heating with the addition of moisture and, in an at least partially cooled state, is subsequently incorporated into the casing.

6. The method as claimed in claim 1, wherein the flour is selected from the group consisting of rice flour, tapioca flour and corn flour.

7. The method as claimed in claim 1, wherein breadcrumbs are used to form the crumb layer.

8. A product roll prepared according to the method of claim 1, wherein said product roll is in a frozen state.

9. A product roll as claimed in claim 8, wherein the barrier layer is a sheet selected from the group consisting of edible seaweed and rice paper.

10. The method as claimed in claim 1, wherein partially cooked rice is applied as said at least partially cooked grain product.

11. The method according to any one of claims 1-3, 4, 5, 6, 7 and 10, wherein said product roll consists of a sushi roll covered in a batter layer with a crumb layer covering the batter layer.

12. The product roll according to either claim 8 or 9, wherein said product roll consists of a sushi roll covered in a batter layer with a crumb layer covering the batter layer.

13. A method for producing a food product prepared in a form in which said food product is ready for immediate consumption, having a crispy outer layer comprising a batter layer, said method comprising the steps of:
   (i) providing a product roll by:
      providing an edible core that is ready for immediate consumption, comprising at least one product selected from the group consisting of vegetables, fruits, meats, fishes, seafoods and dairy products;
      surrounding said core by a casing of an at least partially cooked grain product to form a cylindrical body that comprises said core surrounded by said casing;
      surrounding said cylindrical body by a barrier layer of an edible sheet;
      coating said barrier layer with the batter to form a layer of said batter over the cylindrical body; and
      arranging crumbs on said batter layer to form a crumb layer;
   (ii) subjecting said product roll to a freezing step for complete deep freezing thereof to a frozen state by dry-freezing or shock-freezing and storing said product roll in said frozen state prior to heating the product roll by baking or deep-frying in step (iii); and (iii) deep-frying or baking said product roll from said frozen state to a state at which said batter and crumb layer are baked or deep-fried into the crispy outer layer, while said core is no more than just defrosted, to bring the product into said form in which it is ready for immediate consumption;

wherein the at least one product used to form the edible core is applied in a raw, uncooked, fresh, or refreshed form and is kept that way at least up to the freezing step of step (ii).

14. The method according to claim 13, wherein said product roll consists of a sushi roll covered in a batter layer with a crumb layer covering the batter layer.

15. A product roll as made in the method of claim 13 or 14, wherein said product roll is in a frozen state.

\* \* \* \* \*